US008328501B2

(12) United States Patent
Brazell et al.

(10) Patent No.: US 8,328,501 B2
(45) Date of Patent: Dec. 11, 2012

(54) FAN INTAKE SHIELD

(75) Inventors: Kenneth M. Brazell, Piedmont, SC (US); Jesse J. Jerabek, Anderson, SC (US)

(73) Assignee: Techtronic Outdoor Products Technology Limited, Hamilton (BM)

( * ) Notice: Subject to any disclaimer, the term of this patent is extended or adjusted under 35 U.S.C. 154(b) by 709 days.

(21) Appl. No.: 12/577,476

(22) Filed: Oct. 12, 2009

(65) Prior Publication Data
US 2010/0092277 A1   Apr. 15, 2010

Related U.S. Application Data

(60) Provisional application No. 61/104,877, filed on Oct. 13, 2008.

(51) Int. Cl.
*F04D 29/70* (2006.01)

(52) U.S. Cl. .............. 415/121.2; 416/247 R; 15/327.5; 15/405; 15/412

(58) Field of Classification Search ............. 415/121.2, 415/121.1, 203, 204; 416/247 R; 15/237.5, 15/345, 405, 412, 422; 417/423.9
See application file for complete search history.

(56) References Cited

U.S. PATENT DOCUMENTS

| | | |
|---|---|---|
| 2,747,558 A | 5/1956 | Kiekhaefer |
| 3,433,206 A | 3/1969 | Pennington |
| 3,867,058 A | 2/1975 | Hendrickson |
| 4,370,855 A | 2/1983 | Tuggle |
| 4,404,706 A * | 9/1983 | Loyd ............................... 15/344 |
| 4,703,825 A | 11/1987 | Mikami et al. |
| 4,838,908 A | 6/1989 | Bader et al. |
| 4,841,920 A | 6/1989 | Andreasson et al. |
| 4,970,993 A | 11/1990 | Weiss et al. |
| 5,168,837 A | 12/1992 | Scholz |
| 5,199,389 A | 4/1993 | Wolf et al. |
| 5,285,751 A | 2/1994 | Liegeois et al. |
| 5,377,632 A | 1/1995 | Aronsson et al. |
| 5,687,689 A | 11/1997 | Santos |
| D393,506 S | 4/1998 | Ohi et al. |
| 5,951,245 A * | 9/1999 | Sullivan ......................... 415/192 |
| 6,092,988 A * | 7/2000 | Botros ........................... 415/191 |
| 6,232,672 B1 | 5/2001 | Leufen et al. |
| 6,295,953 B1 | 10/2001 | Ohsawa et al. |
| 6,640,443 B2 | 11/2003 | Husges et al. |

(Continued)

FOREIGN PATENT DOCUMENTS
JP   11300657   11/1999

*Primary Examiner* — Richard Edgar
*Assistant Examiner* — Ryan Ellis
(74) *Attorney, Agent, or Firm* — Michael Best & Friedrich LLP

(57) ABSTRACT

A power tool includes a housing having an intake aperture, a fan disposed within the housing and operable to draw air through the intake aperture, and a fan intake shield positioned adjacent the intake aperture. The fan intake shield includes a first rib, a second rib adjacent the first rib and spaced from the first rib to define an air flow path into the intake aperture between the first rib and the second rib, and a third rib adjacent the first rib and spaced from the first rib to define an air flow path into the intake aperture between the first rib and the third rib. Each of the first, the second, and the third ribs has a respective height, and the height of the first rib is greater than the height of the second rib and the height of the third rib.

22 Claims, 5 Drawing Sheets

U.S. PATENT DOCUMENTS

| | | |
|---|---|---|
| D484,586 S | 12/2003 | Intravatola |
| 6,706,084 B2 | 3/2004 | Bayer et al. |
| 6,726,734 B2 | 4/2004 | Bayer et al. |
| 6,766,560 B2 | 7/2004 | Murphy |
| 6,964,255 B2 | 11/2005 | Shomura et al. |
| D534,267 S | 12/2006 | Andersen et al. |
| D534,272 S | 12/2006 | Frampton et al. |
| D541,503 S | 4/2007 | Lee |
| 7,300,484 B2 | 11/2007 | Scully et al. |
| 7,311,067 B2 * | 12/2007 | Riehmann .................... 123/41.7 |
| 7,520,061 B2 | 4/2009 | Herzog et al. |
| 7,922,443 B2 * | 4/2011 | Yuasa ........................ 415/121.2 |
| 2006/0237439 A1 | 10/2006 | Norwood et al. |

* cited by examiner

FAN INTAKE SHIELD

CROSS REFERENCE TO RELATED APPLICATIONS

This application claims priority to U.S. Provisional Patent Application No. 61/104,877, filed Oct. 13, 2008, then entire contents of which are incorporated by reference herein.

BACKGROUND

The present invention relates to power tools, and more particularly to a fan intake shield for power tools.

Power tools, such as saws, trimmers, and leaf blowers, typically include fans or blowers. Such fans intake air through an intake aperture or vent and discharge air through an outlet aperture or vent. Often, an intake shield is utilized to inhibit debris, such as leaves, grass, etc. from being drawn into the fan through the intake aperture.

SUMMARY

In one embodiment, the invention provides a power tool including a housing having an intake aperture, a fan disposed within the housing and operable to draw air through the intake aperture, and a fan intake shield positioned adjacent the intake aperture and configured to inhibit debris from traveling through the intake aperture while allowing air to travel through the intake aperture. The fan intake shield includes a hub having a center, a first rib, and a second rib adjacent the first rib and spaced from the first rib to define an air flow path into the intake aperture between the first rib and the second rib. The fan intake shield further includes a third rib adjacent the first rib and spaced from the first rib to define an air flow path into the intake aperture between the first rib and the third rib. Each of the first rib, the second rib, and the third rib defines a longitudinal axis that extends radially from the hub, a lower edge that faces toward the intake aperture, and an upper edge that faces away from the intake aperture. Each of the first rib, the second rib, and the third rib has a respective height defined as a respective distance from the respective lower edge to the respective upper edge. The height of the first rib is measured at a radial distance from the center of the hub, the height of the second rib and the third rib are measured at the radial distance from the center of the hub, and the height of the first rib is greater than the height of the second rib and the height of the third rib.

In another embodiment, the invention provides a power tool that includes a housing having an intake aperture, a fan disposed within the housing and operable to draw air through the intake aperture, and a fan intake shield positioned adjacent the intake aperture and configured to inhibit debris from traveling through the intake aperture while allowing air to travel through the intake aperture. The fan intake shield includes a first rib, a second rib adjacent the first rib and spaced from the first rib to define an air flow path into the intake aperture between the first rib and the second rib, and a third rib adjacent the first rib and spaced from the first rib to define an air flow path into the intake aperture between the first rib and the third rib. Each of the first rib, the second rib, and the third rib define a longitudinal axis, a lower edge that faces toward the intake aperture, and an upper edge that faces away from the intake aperture. The upper edge of the first rib is located a first linear distance above the upper edge of the second rib measured at a point along the longitudinal axis of the first rib, and the upper edge of the first rib is located a second linear distance above the upper edge of the third rib measured at the point along the longitudinal axis of the first rib.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
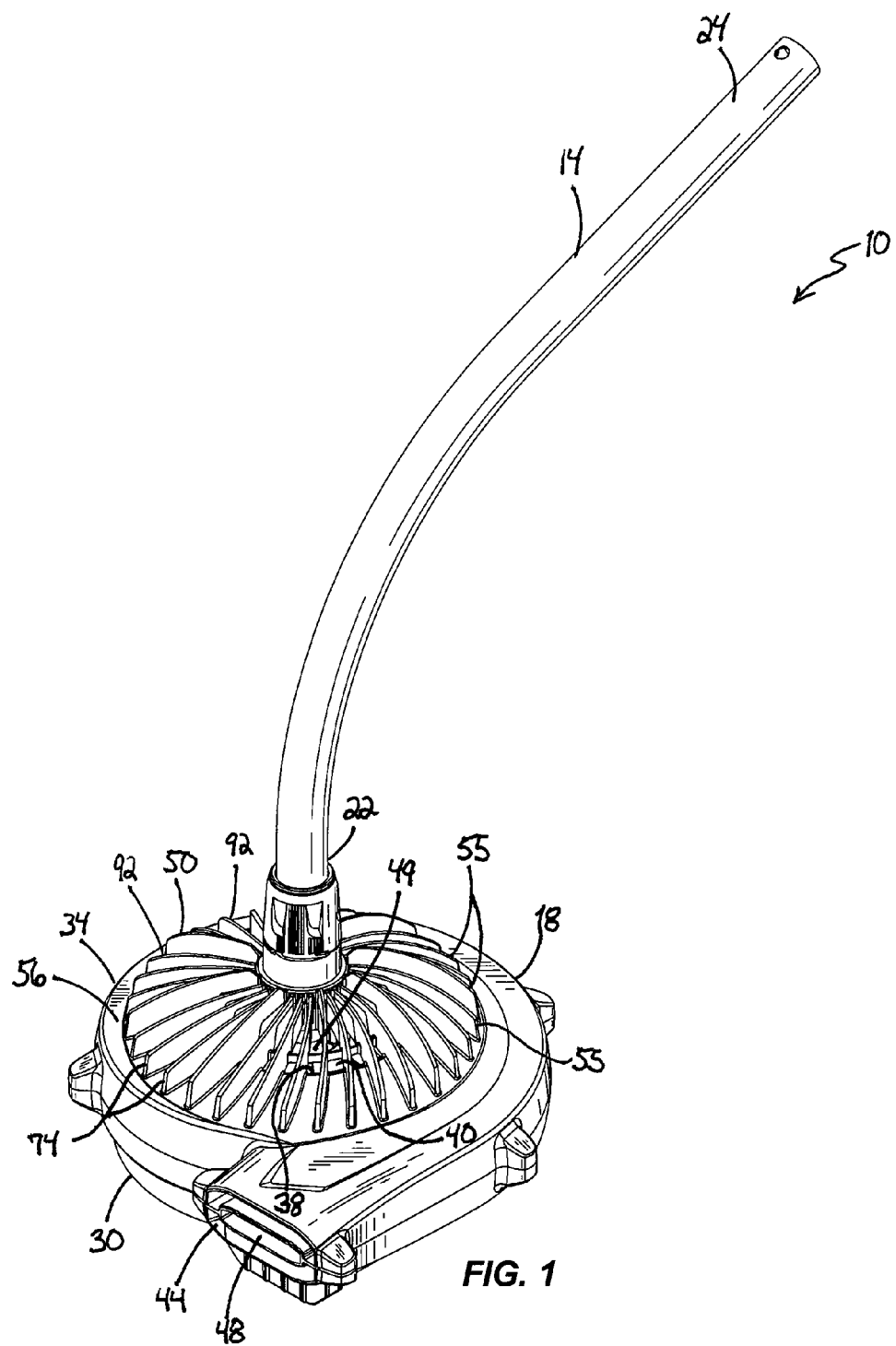
FIG. 1 is a perspective view of a portion of a leaf blower having a fan intake shield according to one embodiment of the invention.

FIG. 1 illustrates a power tool 10, which is a leaf blower in the illustrated construction. The leaf blower 10 including a handle 14 and a blower or fan housing 18. The handle 14 includes a first end portion 22 coupled to the fan housing 18 and a second end portion 24. Although not shown, a drive unit, such as a gas engine or electric motor, is coupled to the second end portion 24 of the handle 14 to operate the leaf blower 10. For example, in one construction, a two-cycle gas engine typically used in trimmers or blowers is coupled to the handle 14 to drive the leaf blower 10. In other constructions, the drive unit may include electric or battery powered motors and the like.

Figure 3:
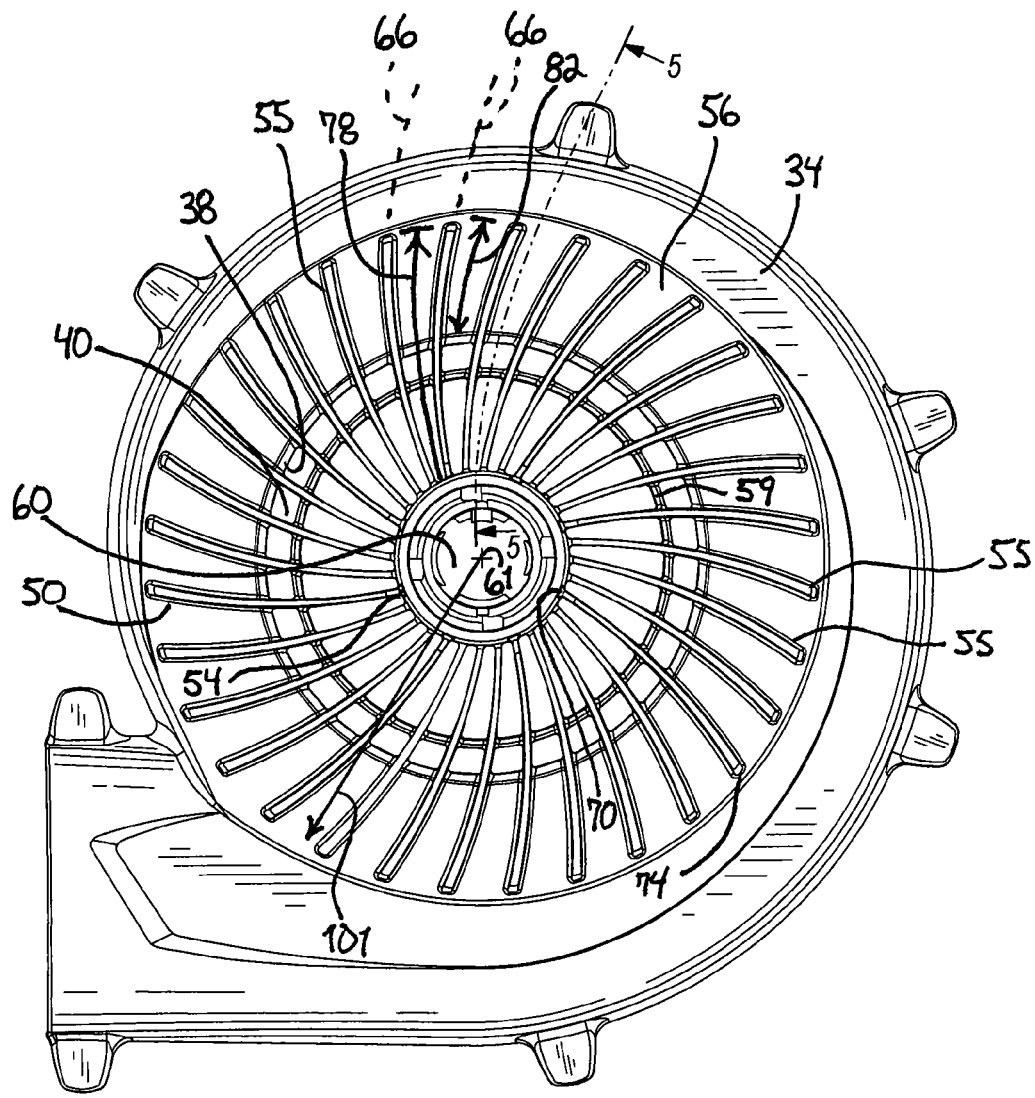
FIG. 3 is a top view of the portion of the fan housing.

Referring to FIGS. 1 and 3, the illustrated fan housing 18 includes a base or bottom portion 30 and a top portion 34. The top portion 34 includes a circular intake aperture 38 that defines an intake 40 of the fan housing 18. While the illustrated aperture 38 is circular, in other constructions the intake aperture can be other shapes, such as square, rectangular, oval, etc.

Figure 2:
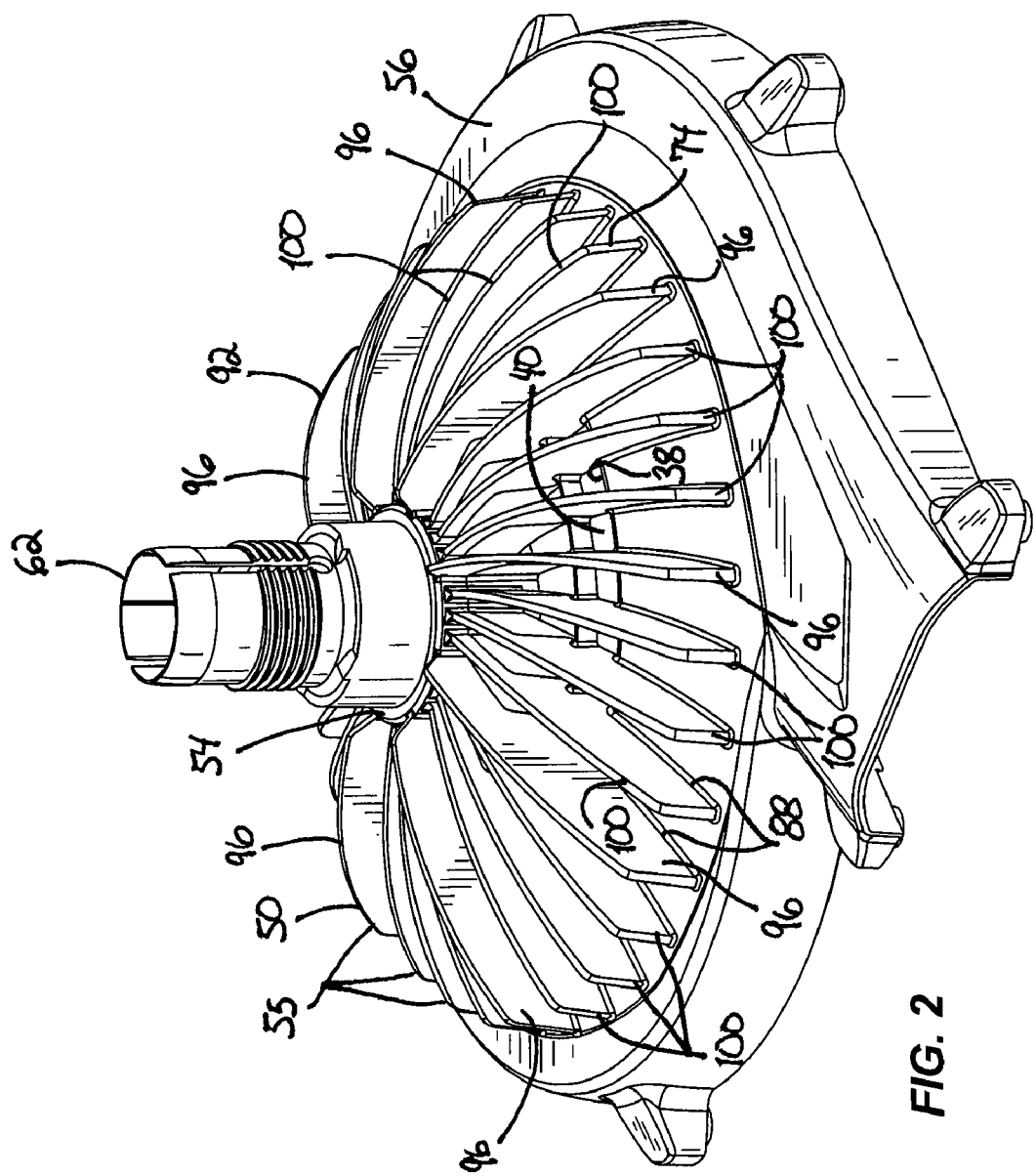
FIG. 2 is a perspective view of a portion of a fan housing of the leaf blower of FIG. 1.

As best seen in FIGS. 1 and 2, the top portion 34 and the bottom portion 30 are coupled, such as by an interference fit or fasteners, and together the top and bottom portions 34 and 30 define an outlet 44 of the fan housing 18. In the illustrated construction, a guard 48 is coupled between the top and bottom portions 34 and 30 proximate the outlet 44.

A fan 49 (FIG. 1) is disposed within the housing 18 between the top portion 34 and the bottom portion 30 of the housing 18. The fan 36 is rotated by the drive unit, discussed above, to draw air through the intake aperture 38 and discharge air through the outlet 44.

Referring to FIGS. 2 and 3, a fan intake shield 50 is formed with the top portion 34 of the fan housing 18 adjacent the intake aperture 38. In the illustrated construction, the fan intake shield 50 is positioned above the intake aperture 38 and external to the housing 18. The fan intake shield 50 includes a hub 54 and a plurality of ribs 55 that extend radially from the hub 54 and upwardly from an outer surface 56 of the fan housing 18. A support member 59 is disposed radially inward from a perimeter of the intake aperture 38 to provide support and rigidity for the hub 54 and the ribs 55. The illustrated hub 54 includes a central aperture 60 (FIG. 3) having a center 61. The aperture 60 receives a coupling 62 for connecting the handle 14 and the fan housing 18. In the illustrated construction the fan intake shield 50 is integrally formed with the top portion 34 of the fan housing 18, such as by molding. In other constructions, the fan intake shield 50 may be formed separate from the top portion 34 and coupled to the top portion 34 after forming, such as by fasteners, adhesives, and the like.

Each of the ribs 55 defines a longitudinal axis 66 (FIG. 3) that extends radially from the center 61 of the hub 54. In the illustrated construction, the longitudinal axes 66 of the ribs 55 are arcuate or curved in a clockwise direction when viewed from the top of the fan housing 18. Each rib 55 includes an inner edge 70 adjacent the central hub 54 and an outer edge 74 opposite the inner edge 70. A length 78 of each of the ribs 55 is defined as the distance from the inner edge 70 to the outer edge 74. In the illustrated construction, the length 78 of each of the ribs 55 is generally equal and is such that each of the ribs 55 extends a distance 82 past the perimeter of the intake aperture 38.

Figure 4:
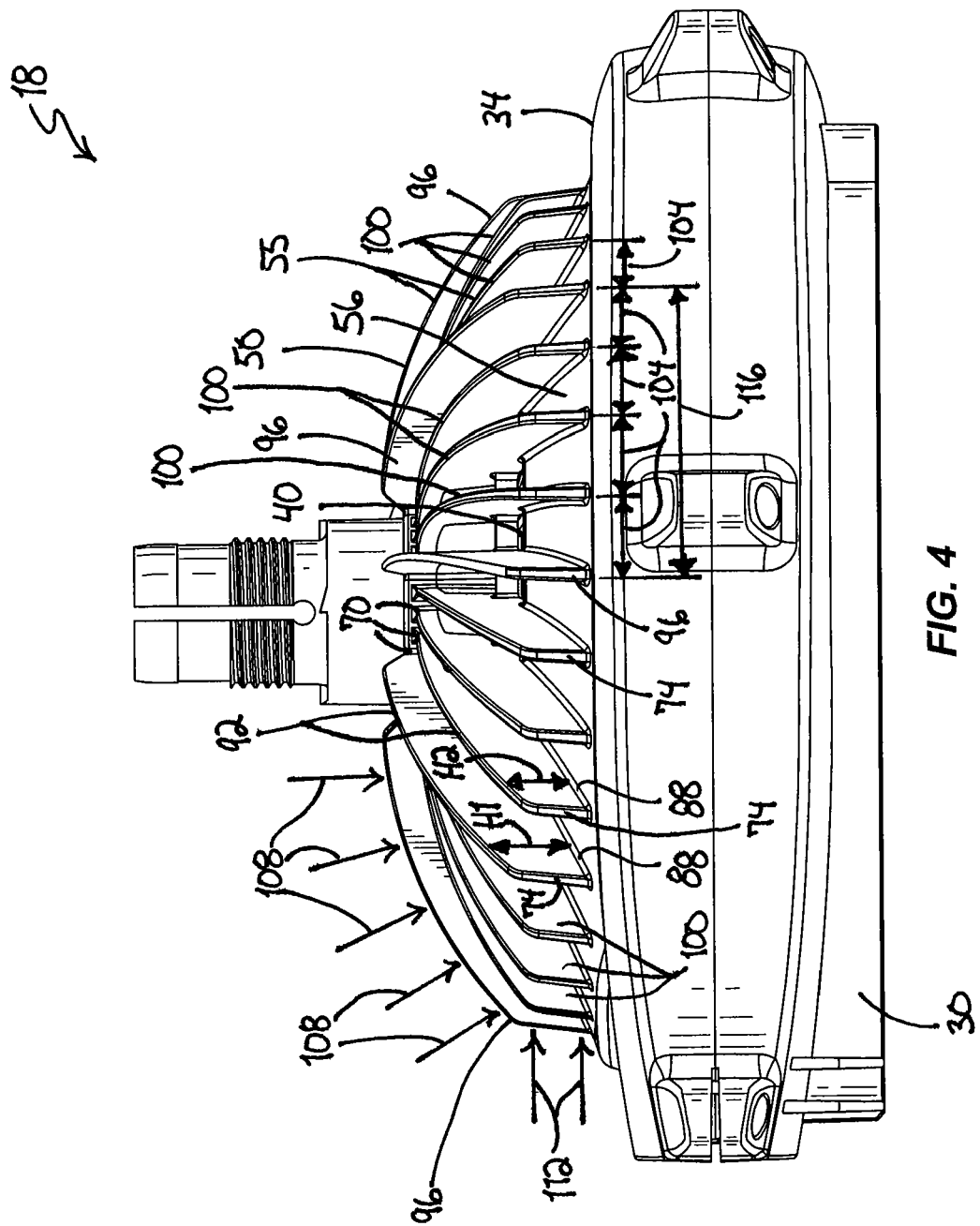
FIG. 4 is a side view of the fan housing.
Figure 5:
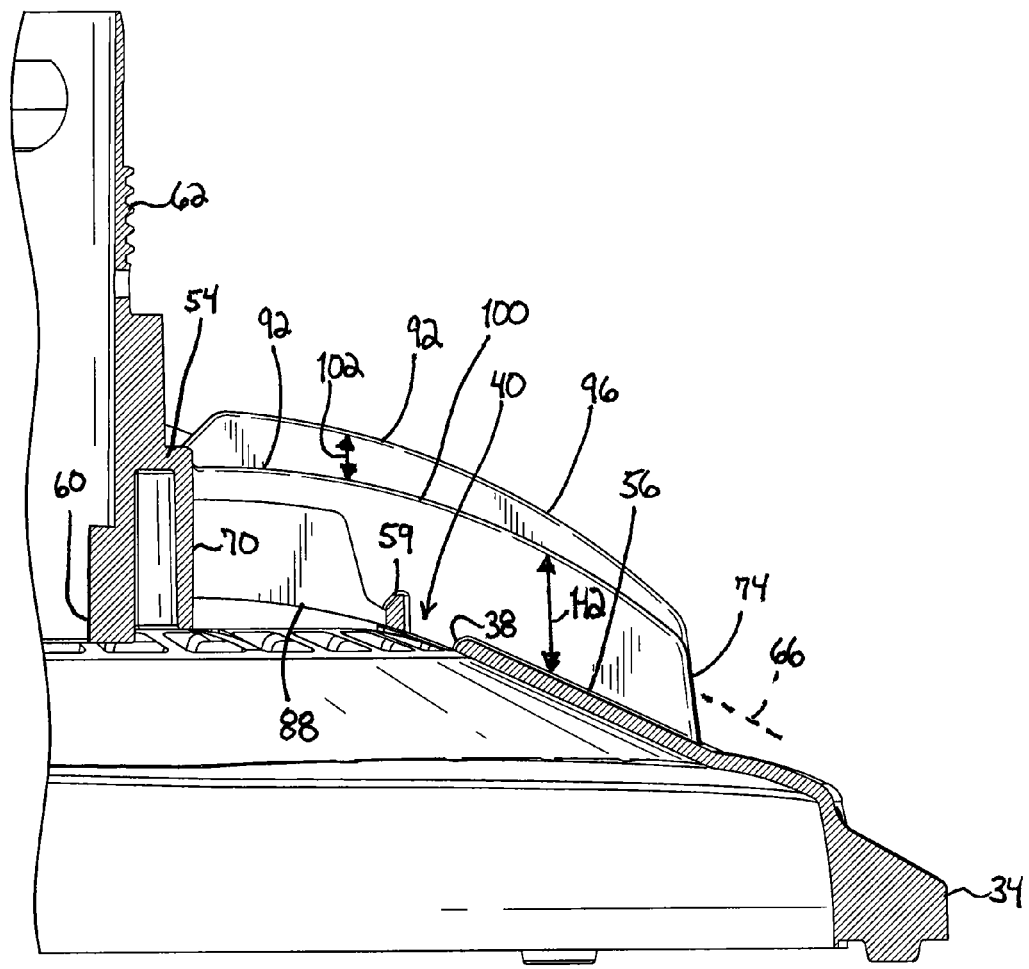
FIG. 5 is a cross sectional view of a portion of the fan housing taken along line 5-5 of FIG. 3.

Referring to FIGS. 4 and 5, each of the ribs 55 further includes a lower edge 88, which faces toward the intake aperture 38 and is adjacent the top portion 34 of the fan housing 18, and an upper edge 92 opposite the lower edge 88, which faces away from the intake aperture 38. A height of each of the ribs 55 is defined as the distance from the lower edge 88 to the upper edge 92 at a point along the longitudinal axis 66. As best seen in FIG. 5, the height of each of the ribs 55 varies along the respective longitudinal axis 66. The illustrated fan intake shield 50 includes a first set of ribs having a height H1 (these ribs have been given reference numeral 96) and a second set of ribs having a height H2 (these ribs have been given reference numeral 100). The height H1 of the ribs 96 decreases from the inner edge 70 toward the outer edge 74 such that the upper edges 92 of the ribs 96 is curved or arcuate. Likewise, the height H2 of the ribs 100 decreases from the inner edge 70 toward the outer edge 74 such that the upper edges 92 of the ribs 100 is curved or arcuate. Alternatively stated, the height H1, H2 of the ribs 96, 100, respectively, decreases as a radial distance 101 (FIG. 3) from the center 61 of the hub 54 increases.

In the illustrated construction, the height H1 of each of the ribs 96 is greater than the height H2 of each of the ribs 100. As discussed above, each of the ribs 96 has the same height H1 at a same point along the longitudinal axis 66 (e.g., at the same radial distance 101 (FIG. 3) from the center 61 of the hub aperture 60). Likewise, each of the ribs 100 has the same height H2 at a same point along the longitudinal axis 66. As best seen in FIG. 5, the upper edge 92 of each of the ribs 96 is located a linear distance 102 above the upper edge 92 of each of the ribs 100. Accordingly, for a given radial distance 101 (FIG. 3), each of the ribs 96 extends above each of the ribs 100 by the same linear distance 102. In the illustrated construction, the distance 102 generally decreases as the radial distance 101 increases. However, in the illustrated construction, the upper edge 92 of each of the ribs 96 is above the upper edge 92 of each of the ribs 100 along the entire length 78 of the ribs 96, 100. In other constructions, the upper edge 92 of each of the ribs 96 is above the upper edge 92 of each of the ribs 100 along at least about half of the length 78 of the ribs 96, 100.

A height ratio (H2/H1) is defined as the height H2 of the ribs 100 divided by the height H1 of the ribs 96 at the same point along the respective longitudinal axes 66 (e.g., same radial distance 101 from the center 61 of the hub 54). In the illustrated construction, the ratio H2/H1 varies along the longitudinal axis 66 of the ribs 96, 100 from about 0.70 adjacent the inner edge 70 of the ribs 96, 100 to about 0.80 adjacent the outer edge 74 of the ribs 96, 100. In other constructions, the ratio H2/H1 may be constant along the longitudinal axis 66 of the ribs 96, 100. In yet other constructions, the ratio H2/H1 may be less than 0.70 or greater than 0.80.

As best seen in FIGS. 3 and 4, in the illustrated construction, each of the ribs 55 is spaced an equal distance 104 apart (measured between outer edges 74 of adjacent ribs 55) such that adjacent ribs 55 form a first air flow path (represented by arrows 108) and a second air flow path (represented by arrows 112) therebetween. The first flow path 108 is defined as the flow path generally normal to the upper edges 92 of the ribs 55 and the second flow path 112 is defined as the flow path generally normal to the outer edges 74 of the ribs 55 and partially formed by the outer surface 56 of the fan housing 18.

The ribs 96 having the first height H1 are spaced an equal distance 116 apart (measured between the outer edges 74 of the ribs 96) around the entire circumference of the intake aperture 38. In the illustrated construction, the space or distance 116 between ribs 96 of the first set is such that three of the ribs 100 of the second set, which are spaced the distance 104 with respect to adjacent ribs 96 and 100 of the first and second sets, respectively, are positioned between each of the ribs 96 having the first height H1. In other constructions, fewer or more ribs 100 having the height H2 are positioned between the ribs 96 having the greater height H1. A distance ratio (D1/D2) is defined as the distance 104 divided by the distance 116. In the illustrated construction, the ratio D1/D2 is about 0.21. In other constructions, the ratio D1/D2 is greater or less than 0.21.

Referring to FIGS. 1 and 4, during operation of the leaf blower 10, air is drawn into the fan housing 18 through the intake 40 and discharged through the outlet 44 by the fan 49 within the housing 18. Also, during operation, the fan 49 of the leaf blower 10 may draw debris, such as leaves, toward the intake 40. The ribs 55 of the fan intake shield 50 inhibit the leaves and other debris from being drawn through the intake 40 and into the fan housing 18. Furthermore, the ribs 96 having the height H1 greater than the height H2 of the ribs 100 inhibit the leaves from lying flat across the upper edges 92 of the ribs 96 and 100 to undesirably restrict the amount of air drawn through the intake. By restricting leaves and or other debris from lying flat on the upper edges 92 of the ribs 96 and 100, a sufficient amount of air is drawn around the leaves through the first flow path 108 and the second flow path 112.

While the fan intake shield 50 has been described herein for use with the leaf blower 10 illustrated in FIG. 1, a fan intake shield embodying the illustrated construction may be utilized with other types of leaf blowers. For example, such a fan intake shield may be utilized with what is commonly referred to as a handheld leaf blower where the engine and blower are housed within the same housing having a single handle for the user. In addition, while the fan intake shield 50 has been described herein for use with leaf blowers, a fan intake shield embodying the illustrated construction may be used with other power tools, such as trimmer, drills, chainsaws, other types of saws and the like.

Although particular constructions embodying independent aspects of the present invention have been shown and described, other alternative constructions will become apparent to those skilled in the art and are intended scope of the independent aspects of the invention.

What is claimed is:

1. A power tool comprising:
 a housing including an intake aperture;

a fan disposed within the housing and operable to draw air through the intake aperture; and a fan intake shield positioned adjacent the intake aperture and configured to inhibit debris from traveling through the intake aperture while allowing air to travel through the intake aperture, the fan intake shield including,
 a hub having a center,
 a first rib,
 a second rib adjacent the first rib and spaced from the first rib to define an air flow path into the intake aperture between the first rib and the second rib, and
 a third rib adjacent the first rib and spaced from the first rib to define an air flow path into the intake aperture between the first rib and the third rib,
wherein each of the first rib, the second rib, and the third rib define a longitudinal axis that extends radially from the hub, a lower edge that faces toward the intake aperture, and an upper edge that faces away from the intake aperture,
wherein each of the first rib, the second rib, and the third rib have a respective height defined as a respective distance from the respective lower edge to the respective upper edge, and
wherein the height of the first rib is measured at a radial distance from the center of the hub,
wherein the height of the second rib and the third rib are measured at the radial distance from the center of the hub,
wherein the height of the first rib is greater than the height of the second rib and the height of the third rib.

2. The power tool of claim 1, wherein the height of the third rib is equal to the height of the second rib.

3. The power tool of claim 1, wherein the height of each of the first rib, the second rib, and the third rib varies along the respective longitudinal axis.

4. The power tool of claim 3, wherein the height of each of the first rib, the second rib, and the third rib generally decreases as the radial distance from the center of the hub increases.

5. The power tool of claim 1, further comprising:
 a fourth rib adjacent the second rib and spaced from the second rib to define an air flow path into the intake aperture between the second rib and the fourth rib, and
 a fifth rib adjacent the third rib and spaced from the third rib to define an air flow path into the intake aperture between the fifth rib and the third rib,
wherein each of the fourth rib and the fifth rib define a longitudinal axis that extends radially from the hub, a lower edge that faces toward the intake aperture, and an upper edge that faces away from the intake aperture,
wherein each of the fourth rib and the fifth rib have a respective height defined as a respective distance from the respective lower edge to the respective upper edge, the height being measured the radial distance from the center of the hub, and
wherein the height of the first rib is greater than the height of the fourth rib and the height of the fifth rib.

6. The power tool of claim 5, wherein the height of the second rib, the height of the third rib, the height of the fourth rib, and the height of the fifth rib are generally equal.

7. The power tool of claim 5, further comprising:
 a sixth rib; and
 a seventh rib,
wherein each of the sixth rib and the seventh rib define a longitudinal axis that extends radially from the hub, a lower edge that faces toward the intake aperture, and an upper edge that faces away from the intake aperture,
wherein each of the sixth rib and the seventh rib have a respective height defined as a respective distance from the respective lower edge to the respective upper edge, the height being measured the radial distance from the center of the hub, and
wherein the height of the sixth rib and the height of the seventh rib are greater than the height of each of the fourth rib and the fifth rib.

8. The power tool of claim 7, wherein the height of the sixth rib and the height of the seventh rib are equal to the height of the first rib.

9. The power tool of claim 7, wherein the height of the sixth rib and the height of the seventh rib are greater than the height of each of the second rib and the third rib.

10. The power tool of claim 1, wherein a height ratio is defined as the height of the second rib divided by the height of the first rib, wherein the height ratio is less than about 0.8.

11. The power tool of claim 10, wherein the height ratio is less than about 0.7.

12. The power tool of claim 10, wherein the height ratio generally increases as the radial distance from the center of the hub increases.

13. The power tool of claim 1, wherein each of the first rib, the second rib, and the third rib include an inner edge positioned proximate the hub and an outer edge opposite the inner edge, wherein each of the first rib, the second rib, and the third rib have a respective length defined as a respective distance measured from the respective inner edge to the respective outer edge along the respective longitudinal axis, and wherein the length of the first rib is generally equal to the length of the second rib and the length of the third rib.

14. The power tool of claim 1, wherein the housing includes an outer surface adjacent the intake opening, wherein the first rib includes a portion that extends from the outer surface, wherein the second rib includes a portion that extends from the outer surface, and wherein a second air flow path into the intake aperture is defined by the first rib, the second rib, and a portion of the outer surface between the first rib and the second rib.

15. The power tool of claim 1,
 wherein each of the first rib, the second rib, and the third rib define a first end, a second end, and a respective length defined as a distance from the respective first end to the respective second end along the respective longitudinal axis,
 wherein the upper edge of the first rib is located above the upper edge of the second rib along at least half of the length of the first rib, and
 wherein the upper edge of the first rib is located above the upper edge of the third rib along at least half of the length of the first rib.

16. A power tool comprising:
 a housing including an intake aperture;
 a fan disposed within the housing and operable to draw air through the intake aperture; and
 a fan intake shield positioned adjacent the intake aperture and configured to inhibit debris from traveling through the intake aperture while allowing air to travel through the intake aperture, the fan intake shield including,
  a first rib,
  a second rib adjacent the first rib and spaced from the first rib to define an air flow path into the intake aperture between the first rib and the second rib, and
  a third rib adjacent the first rib and spaced from the first rib to define an air flow path into the intake aperture between the first rib and the third rib, wherein each of the first rib, the second rib, and the third rib define a longitudinal axis, a lower edge that faces toward the intake aperture, and an upper edge that faces away from the intake aperture, wherein the upper edge of the first rib is located a first linear distance above the upper edge of the second rib measured at a point along the longitudinal axis of the first rib, wherein the upper edge of the first rib is located a second linear distance above the upper edge of the third rib measured at the point along the longitudinal axis of the first rib, and wherein the intake shield further includes a hub, wherein the first, the second, and the third ribs extend radially from the hub.

17. The power tool of claim 16, wherein the first linear distance is substantially equal to the second linear distance.

18. The power tool of claim 16, further comprising:
a fourth rib adjacent the second rib and spaced from the second rib to define an air flow path into the intake aperture between the second rib and the fourth rib; and
a fifth rib adjacent the third rib and spaced from the third rib to define an air flow path into the intake aperture between the fifth rib and the third rib,
wherein each of the fourth rib and the fifth rib define a longitudinal axis, a lower edge that faces toward the intake aperture, and an upper edge that faces away from the intake aperture,
wherein the upper edge of the first rib is located a third linear distance above the upper edge of the fourth rib measured at the point along the longitudinal axis of the first rib, and
wherein the upper edge of the first rib is located a fourth linear distance above the upper edge of the fifth rib measured at the point along the longitudinal axis of the first rib.

19. The power tool of claim 18, wherein the first linear distance, the second linear distance, the third linear distance, and the fourth linear distance are substantially equal.

20. The power tool of claim 18, further comprising
a sixth rib; and
a seventh rib,
wherein each of the sixth rib and the seventh rib define a longitudinal axis, a lower edge that faces toward the intake aperture, and an upper edge that faces away from the intake aperture,
wherein the upper edge of the sixth rib is located a fifth linear distance above the upper edge of the fourth rib measured at the point along the longitudinal axis of the sixth rib, and
wherein the upper edge of the seventh rib is located a sixth linear distance above the upper edge of the fifth rib measured at the point along the longitudinal axis of the seventh rib.

21. The power tool of claim 20, wherein the first, the second, the third, the fourth, the fifth, and the sixth linear distances are substantially equal.

22. The power tool of claim 16,
wherein each of the first rib, the second rib, and the third rib define a first end, a second end, and a respective length defined as a distance from the respective first end to the respective second end along the respective longitudinal axis,
wherein the upper edge of the first rib is located above the upper edge of the second rib along at least half of the length of the first rib, and
wherein the upper edge of the first rib is located above the upper edge of the third rib along at least half of the length of the first rib.

* * * * *